Figure 1:
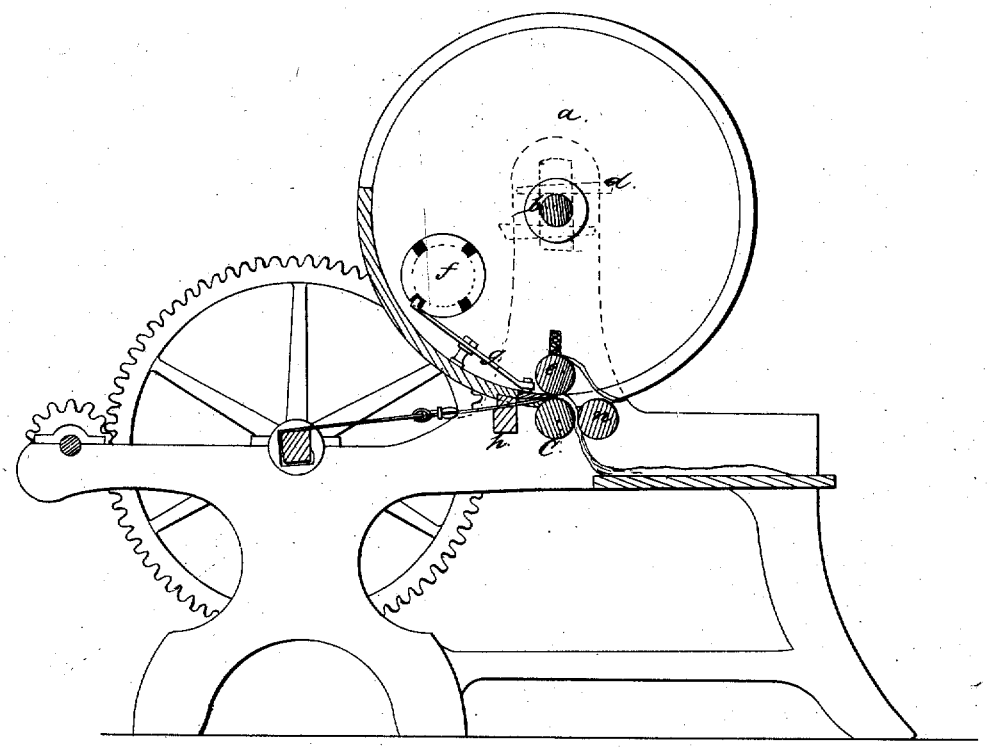
Figure 2:
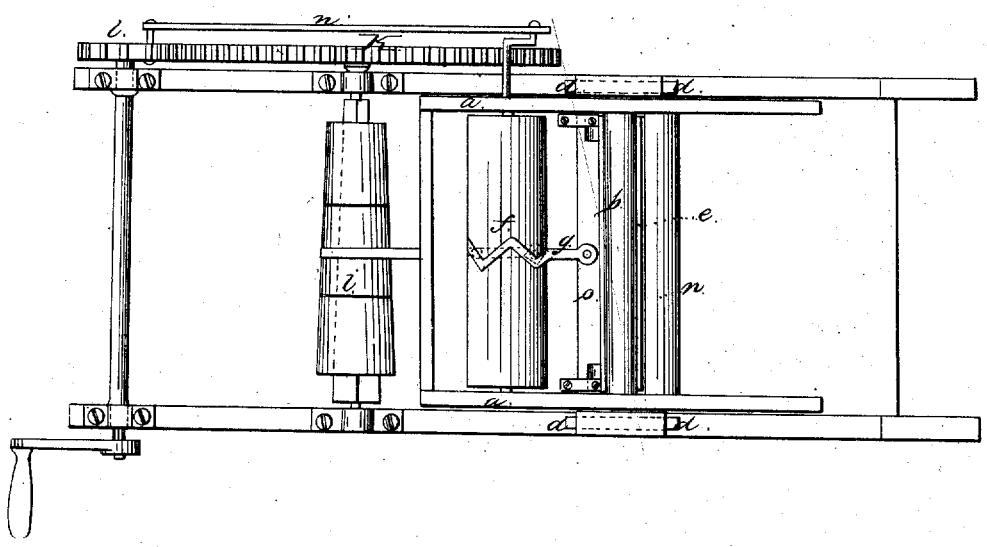

No Printed Specification Available

1336X

P. Dorr,

Splitting Leather,

Patented July 12, 18.

1336 X July 12. 1810. 1 47

Phinehas Dow
Letters Patent

July 12, 1810

The Schedule referred to in these Letters Patent and making part of the same containing a description in the words of the said Phinehas Dow himself of his cylindrical Leather Splitting Mill The invention of this improvement called the "Cylindrical Leather Splitting Mill" consists in
constructing the machine with a Cylinder on which the Knife is fixed to split the Leather. This
Cylinder is made of Wood with an Iron or wooden axis on which it turns. The ends of the cy-
linder may be made of wood or cast iron about two feet or more in diameter. The Knife is fixed
in the circumference of this Cylinder parallel with its said axis, and is made to move endways by a crank
which communicates with the Roller round which the Leather is drawn when it is split-
ing. This Cylinder is fixed in a proper frame. When in operation the Knife is turned [illegible] the
said Cylinder so as to be under the centre of it. Directly under the Knife a roller is perma-
nently fixed on the frame which serves as the gauge of the Leather while splitting and is
made to fit the edge of the Knife so as to allow half the thickness of the Leather to pass be-
tween it and the edge of the Knife. The Knife is regulated to this roller according as the Leath-
er may require by wedges on the top of the boxes of the pivots of the said Cylinder axis.
Above the edge of said Knife another roller is fixed in said Cylinder with springs on
its pivots in the ends of said Cylinder so as to press said Roller down close to the [illegible] [illegible]
said Knife and keep the Leather also pressed upon said Roller under the edge of said [illegible]
The Cylinder has only a quarter section of its circumference in the other part is left open.
To this quarter section the Knife is fixed and the machinery for giving motion to the Knife.
This motion to the Knife is produced by a roller put into said Cylinder with an oblique or
spiral groove. A lever fixed in the Cylinder so as to move said Knife endways is operated
upon by said spiral groove and is [illegible] one way and the other by a crank on said
Roller to which Crank an arm is fixed which communicates with the primary motion
of the machine. Back of the Knife is constructed a spreader which is made of wood fitting
together like jaws having notches cut in them obliquely each way so as to spread the Leath-
er as it is drawn in while splitting. The under jaw is on the frame, the upper is on the Cylinder.
When the leather is to be put in the said Cylinder is turned back so as to bring the Knife up-
ward or at the top of the Cylinder (which lies horizontally) in which position it is easily taken
out and sharpened and put in again. Two stopping latches are fixed to the end of the Cylinder
so as to allow the edge of the Knife to come to its proper place and there to be kept firmly

[illegible] 1336X while splitting the leather. A conical square Roller with three whirls fitted to it, is fitted into the frame round which the leather is drawn while splitting. The said whirls are moveable on said square roller so as to prevent the Leather from stretching. A pair of nippers with [illegible] jaws is fixed with proper Leather straps to this roller. These nippers take hold of the leather & [illegible] ing said conical Roller, they haul it through and as it is split, it then is wound [illegible] this roller. On one end of this conical Roller a contrate cast iron wheel two feet in diameter is firmly fixed. This contrate wheel is turned by a pinion to which a crank is fixed by which the whole machine is made to operate. Another roller is also fixed on the frame so as to keep the leather while splitting up close to the surface of the cylinder. The roller under the edge of the knife and which forms the gauge is made of cast iron about five inch in diameter and is accurately turned. The other Rollers are made of hard wood. The sides of Neats leather as well as sheep and other skins may be split by this machine while wet so as to make two skins out of one.

Enrd. Witnesses Phineas Dow
[illegible]
John Fairbanks
Josiah Loring Drawing made by [illegible]

18 [illegible] 1830